United States Patent
Hara et al.

(10) Patent No.: US 7,107,323 B2
(45) Date of Patent: Sep. 12, 2006

(54) SYSTEM AND METHOD OF FILE DISTRIBUTION FOR A COMPUTER SYSTEM IN WHICH PARTIAL FILES ARE ARRANGED ACCORDING TO VARIOUS ALLOCATION RULES

(75) Inventors: Junichi Hara, Yokohama (JP); Masaaki Iwasaki, Tachikawa (JP); Koji Sonoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 40 days.

(21) Appl. No.: 10/637,910

(22) Filed: Aug. 8, 2003

(65) Prior Publication Data

US 2004/0205109 A1    Oct. 14, 2004

(30) Foreign Application Priority Data

Mar. 17, 2003    (JP)    ............................. 2003-071189

(51) Int. Cl.
*G06F 15/16* (2006.01)
*G06F 15/173* (2006.01)

(52) U.S. Cl. ...................... 709/218; 709/217; 709/225; 709/243

(58) Field of Classification Search ................ 709/203, 709/208, 217, 218, 226; 707/200; 370/400, 370/428
See application file for complete search history.

(56) References Cited

U.S. PATENT DOCUMENTS

| | | | |
|---|---|---|---|
| 6,374,336 B1 | 4/2002 | Peters et al. | |
| 6,415,373 B1 | 7/2002 | Peters et al. | |
| 6,449,688 B1 | 9/2002 | Peters et al. | |
| 2002/0114341 A1* | 8/2002 | Sutherland et al. | 370/428 |
| 2002/0131423 A1* | 9/2002 | Chan et al. | 370/400 |
| 2003/0110263 A1* | 6/2003 | Shillo | 709/226 |
| 2003/0126202 A1* | 7/2003 | Watt | 709/203 |
| 2003/0145086 A1* | 7/2003 | O'Reilly | 709/226 |
| 2003/0212571 A1* | 11/2003 | Sazawa et al. | 707/200 |
| 2004/0205143 A1* | 10/2004 | Uemura | 709/208 |

FOREIGN PATENT DOCUMENTS

| | | |
|---|---|---|
| JP | 08-77054 | 3/1996 |
| JP | 08-077054 | 3/1996 |
| JP | 2000-207370 | 7/2000 |
| WO | WO99/55046 A1 | 10/1999 |

OTHER PUBLICATIONS

Sean Rhea, et al., "Maintenance-Free Global Data Storage," *IEEE Internet Computing* (Sep./Oct. 2001), 5(5):40-48.

(Continued)

*Primary Examiner*—Rupal Dharia
*Assistant Examiner*—Quang N. Nguyen
(74) *Attorney, Agent, or Firm*—Townsend and Townsend and Crew LLP (57) ABSTRACT

In a distributed file system, when a user requests a computer to create a distributed file, a management computer acquires a list of computers complying with an allocation rule selected by the user from allocation rules taking the performance, security level, reliability level and utility rate into consideration. When the user requests the computer to access the distributed file, on the other hand, the partial files and the server information are collected from each computer. Each computer evaluates the allocation of the partial files based on the selected allocation rule and the server information from each computer, and if required, selects a destination computer and instructs the partial files to be moved to the destination computer.

3 Claims, 9 Drawing Sheets

OTHER PUBLICATIONS

Casavant et al. "A Taxonomy of Scheduling in General-Purpose Distributed Computing Systems," IEEE Transactions on Software Engineering 14:141:154 (Feb. 1988).

Ligon et al. "Implementation and Performance of a Parallel File System for High Performance Distributed Applications," IEEE Proceedings of the International Symposium of High Performance Distributed Computing 1996, pp. 471-480 (Aug. 1996).

Tatah "The Implementation of the File Service Module for the Distributed File System 'Dragon Slayer III,'" diploma thesis University Dortmund, pp. 9-14, 63-70, and 91-97 (Oct. 2001).

* cited by examiner

| DISTRIBUTED FILE NAME | DISTRIBUTED FILE ATTRIBUTE INFORMATION (FILE TYPE) | PARTIAL FILE ID | STORAGE COMPUTER NAME |
|---|---|---|---|
| DISTRIBUTED FILE A | DATA BASE FILE | A1 | COMPUTER 1A |
|  |  | A2 | COMPUTER 1B |
| DISTRIBUTED FILE B | TEXT FILE | B1 | COMPUTER 1B |
|  |  | B2 | COMPUTER 1C |
| DISTRIBUTED FILE C | TEMPORARY FILE | C1 | COMPUTER 1C |

| COMPUTER NAME | PERFORMANCE [Mbytes/sec] | SECURITY LEVEL | RELIABILITY LEVEL | UTILITY RATE [YEN/Mbytes] |
|---|---|---|---|---|
| COMPUTER 1A | 40 | 5 | 3 | 6 |
| COMPUTER 1B | 50 | 4 | 2 | 4 |
| COMPUTER 1C | 100 | 3 | 1 | 8 |

| ITEM | PRIORITY | VALUE |
|---|---|---|
| PERFORMANCE | 3 | 40 |
| SECURITY | 1 | 4 |
| RELIABILITY | 2 | 2 |
| UTILITY RATE | 0 | — |
| LOAD | 0 | — |

| ITEM | PRIORITY | VALUE |
|---|---|---|
| PERFORMANCE | 0 | — |
| SECURITY | 0 | — |
| RELIABILITY | 0 | — |
| UTILITY RATE | 1 | 8 |
| LOAD | 2 | 70 |

| COMPUTER NAME | PERFORMANCE [Mbytes/sec] | SECURITY LEVEL | RELIABILITY LEVEL | UTILITY RATE [YEN/Mbytes] | LOAD [%] |
|---|---|---|---|---|---|
| COMPUTER 1B | 50 | 4 | 2 | 6 | 50 |
| COMPUTER 1C | 100 | 3 | 1 | 8 | 80 |

FIG.9

| DISTRIBUTED FILE TYPE | PERFORMANCE | | SECURITY | | RELIABILITY | | UTILITY RATE | | LOAD | |
|---|---|---|---|---|---|---|---|---|---|---|
| | PRIORITY | VALUE | PRIORITY | VALUE | PRIORITY | VALUE | PRIORITY | VALUE | PRIORITY | VALUE |
| DATABASE | 1 | 10 | 1 | 4 | 2 | 4 | 0 | — | 3 | — |
| TEXT | 0 | — | 2 | — | 0 | — | 1 | 3 | 0 | — |
| TEMPORARY | 0 | — | 0 | — | 0 | — | 1 | 1 | 0 | — |

FIG.10

| DISTRIBUTED FILE NAME | PERFORMANCE | | SECURITY | | RELIABILITY | | UTILITY RATE | | LOAD | | PARTIAL FILE ID | PARTIAL FILE STORAGE POSITION |
|---|---|---|---|---|---|---|---|---|---|---|---|---|
| | PRIORITY | VALUE | PRIORITY | VALUE | PRIORITY | VALUE | PRIORITY | VALUE | PRIORITY | VALUE | | |
| DISTRIBUTED FILE A | 0 | — | 1 | 4 | 2 | 4 | 0 | — | 3 | — | A1 | COMPUTER 1A |
| | | | | | | | | | | | A2 | COMPUTER 1B |
| DISTRIBUTED FILE B | 3 | 5 | 2 | — | 0 | — | 1 | 3 | 0 | — | B1 | COMPUTER 1B |
| | | | | | | | | | | | B2 | COMPUTER 1C |
| DISTRIBUTED FILE C | 0 | — | 0 | — | 0 | — | 1 | 1 | 0 | — | C1 | COMPUTER 1C |

FIG.13

| DISTRIBUTED FILE TYPE | COPY PERMITTED ? |
|---|---|
| DATABASE | NO |
| TEXT | YES |
| TEMPORARY FILE | YES |

FIG.14

| DISTRIBUTED FILE NAME | COPY PERMITTED ? | PARTIAL FILE ID | PARTIAL FILE STORAGE POSITION |
|---|---|---|---|
| DISTRIBUTED FILE A | NO | A1 | COMPUTER 1A |
| | | A2 | COMPUTER 1B |
| DISTRIBUTED FILE B | YES | B1 | COMPUTER 1B |
| | | B2 | COMPUTER 1C |
| DISTRIBUTED FILE C | NO | C1 | COMPUTER 1C |

SYSTEM AND METHOD OF FILE DISTRIBUTION FOR A COMPUTER SYSTEM IN WHICH PARTIAL FILES ARE ARRANGED ACCORDING TO VARIOUS ALLOCATION RULES

BACKGROUND OF THE INVENTION

Field of the Invention

The present invention relates to a computer system comprising a plurality of computers connected to each other through a network, or in particular to a distributed file system for managing files distributively for the computer system.

A conventional distributed file system for a computer system is disclosed in JP-A-8-77054 as a specific example of the technology in which a cluster of data (hereinafter referred to as "file") used by computer programs, etc. is divided into a plurality of portions (hereinafter referred to as "partial files") arranged distributively among a plurality of computers.

On the other hand, JP-A-2000-207370 discloses a file distribution method, in which partial files are arranged among a plurality of computers based on the load information shared by the computers, including the load of each computer such as the maximum data transfer rate of each computer and the occupancy rate of the storage unit of each computer. Also, according to the method disclosed by JP-A-2000-207370, in the case where a heavy load is imposed on a given computer, the partial files stored in the heavily loaded computer is transferred to other computers.

Also, a distributed file system for a wide-area network based on the assumption that more than hundreds of thousands of computers are connected is proposed in the Sean Rhea et al paper entitled "Maintenance-Free Global Data Storage" (IEEE Internet Computing, Vol. 5, No. 5, September/October 2001, pp. 40–49). In the distributed file system described by this reference, the positions of partial files cannot be specified from a given partial file due to the difference in security level or reliability between the computers connected to the wide-area network. In this way, the security of the distributed file system can be maintained.

In the distributed file system disclosed in JP-A-2000-207370, partial files are moved based only on the load information. In the case where a computer higher in performance than other computers exists in a system, therefore, all the partial files making up a single file may be transferred to the same computer. In such a case, the distribution of partial files making up a given file is meaningless. This disadvantage can be obviated by confirming whether the destination of a partial file has another partial file making up the same file. Specifically, the position of a given partial file making up the same file is specified from the information on another partial file. According to this method, however, as disclosed in the Sean Rhea et al reference above, the security is not maintained for the distributed file system.

Also, in the conventional distributed file system, only the load information of each computer is taken into consideration when laying down the rules (hereinafter referred to as "allocation rule") for determining the allocation of the partial files or moving the partial files. In the distributed file system according to the prior art, therefore, the partial files cannot be arranged or moved under the allocation rules stipulated taking into consideration the difference, if any, in performance, security, reliability level or utility rate between the computers.

Further, in the distributed file system disclosed in JP-A-8-77054, JP-A-2000-207370 and the Sean Rhea et al reference cited above, no consideration is given to the concept of laying down a plurality of allocation rules based on a plurality of types of information and using them differently from each other depending on the situation.

SUMMARY OF THE INVENTION

An object of this invention is to provide a distributed file management method and a distributed file system using the same method, in which security is maintained while at the same time solving the problem that all partial files moved are concentrated in a single computer.

Another object of the invention is to provide a file management method and a distributed file system using the same method for a computer system in which partial files are arranged according to various allocation rules.

In order to achieve the objects described above, according to one aspect of this invention, there is provided a computer system comprising a plurality of computers (hereinafter referred to as "the computer 1") having a storage unit for storing data, a computer (hereinafter referred to as "the computer") of the user and a computer (hereinafter referred to as "the management computer") for managing the aforementioned computers, these computers being connected by a network. In this computer system, the computers 1 manage the performance, security level, reliability level, the utility rate, load information, etc. thereof and transmits these information to the management computer. The management computer collectively manages these information transmitted. On the other hand, the computer 2 has information or allocation rules including a plurality of items for defining the distribution of the partial files making up a file.

When user instructs the computer 2 to create files to be distributed, the computer 2 transmits the information on the allocation rules to the management computer in order to acquire information on the computers 1 meeting the allocation rules. The management computer that has received the allocation rules accesses the information of each computer 1 managed by itself, specifies the computer 1 to which the received allocation rules are applicable, and transmits the information on the specified computer 1 to the computer 2.

The computer 2 that has received the information on the computer 1 to which the allocation rules are applicable transmits, based on the particular information, the partial files of the file to each computer 1 complying with the allocation rules.

According to another aspect of the invention, the computer system may be so configured that the partial files are relocated with a specified event as a motive.

At such a specific event, the computer 2 receives the information on a given computer 1 from the particular computer 1 having partial files making up a file to be relocated. The computer 2 that has received the information on the computer 1 compares the allocation rules of the computer 2 with the received information on the computer 1, and confirms the presence or absence of a computer 1 failing to comply with the allocation rules at the particular time point.

In the presence of a computer 1 failing to comply with the allocation rules, the computer 2 transmits the information on the allocation rules to the management computer in order to confirm the computers 1 complying with the allocation rules. The management computer that has received the allocation rules accesses the information on the computers 1 managed by itself, and specifying the computers 1 complying with the received allocation rules, transmits the information on the particular computers 1 to the computer 2.

The computer 2 that has received the information on the computers 1 complying with the allocation rules selects a specified computer 1 from the received information on the computers 1. After that, the computer 2 transmits an instruction to the computers 1 failing to comply with the allocation rules to transfer the partial files to the specified computers 1 complying with the allocation rules.

The computers 1 and the computer 2 may double as a management computer, and the computer 1 can double as the computer 2.

According to still another aspect of the invention, the priority of the items making up the allocation rules of the computer 2 may be set. In the absence of the computers 1 complying with the allocation rules, the computer 2 relaxes the allocation rules and secures a computer 1 making up the destination of the file (object of relocation) by eliminating the items of low priority from the allocation rules. Any item with priority of zero is not considered to constitute the contents of the allocation rules.

According to yet another aspect of the invention, the computer 2 has a plurality of allocation rules, and uses different allocation rules for different types of files distributed. Also, at the time of file distribution, the user may select or set the priority of each item of the allocation, rules so that the files are distributed according to the result of the selection or setting, as the case may be.

When the computers 1 complying with the allocation rules are not sufficient in number, the computer 2 may store a plurality of partial files in a single computer 1.

According to a further aspect of the invention, the movement of the partial files is withheld until predetermined conditions are met for the computer 1 instructed to move the partial files. In this case, the computer 1 receives a plurality of move instructions for each partial file. The computer 1 checks to see whether some prospective destination computers 1 included in the plurality of the move instructions are doubled or not, and only in the presence of a double computer 1, the partial files are transferred. The predetermined conditions are defined to include a predetermined time length or the time length before receiving a predetermined number of instructions.

Other objects, features and advantages of the invention will become apparent from the following description of the embodiments of the invention taken in conjunction with the accompanying drawings.

DETAILED DESCRIPTION OF THE EMBODIMENTS

Embodiments of this invention will be explained in detail below with reference to the accompanying drawings.

Figure 1:
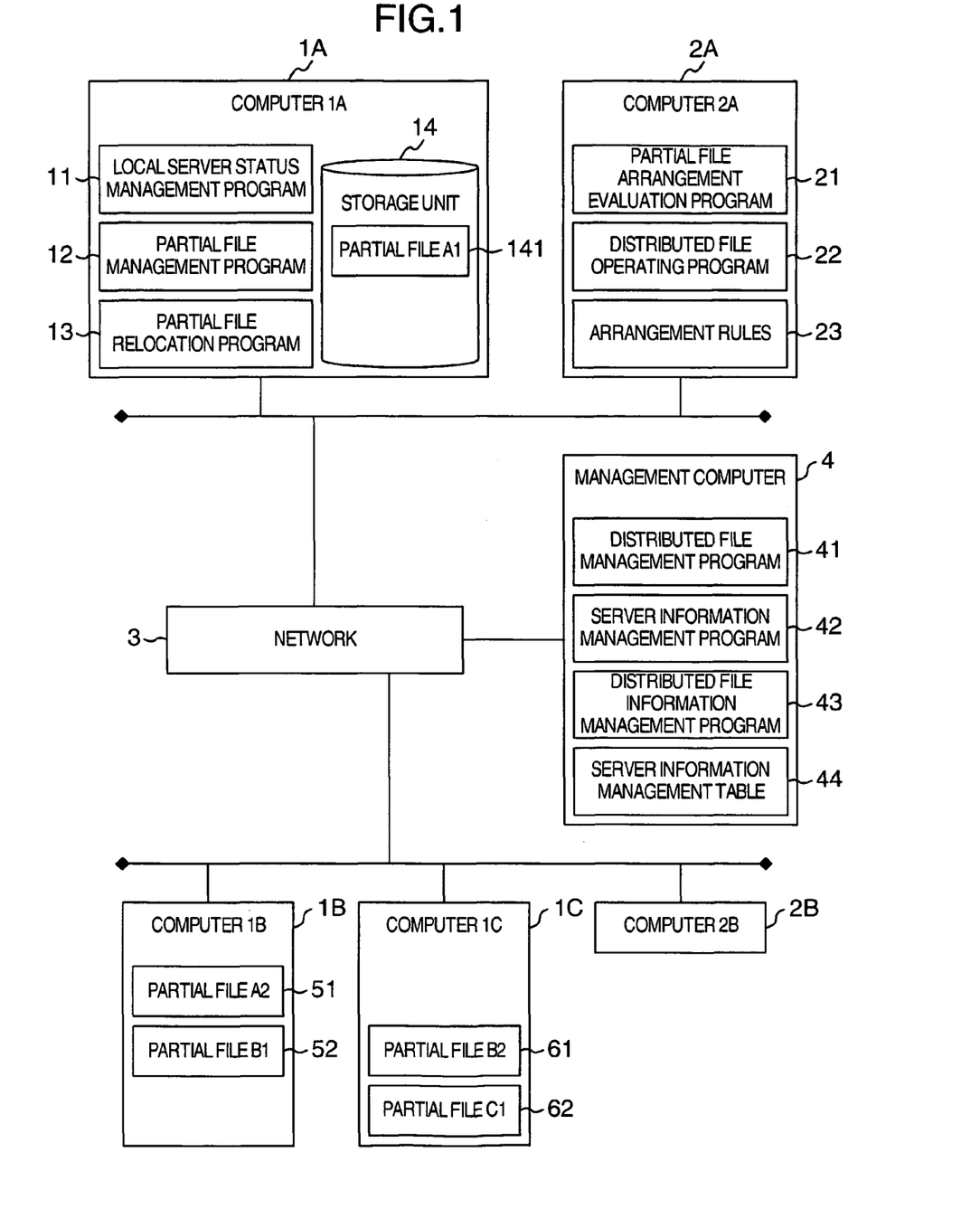
FIG. 1 is a block diagram showing a computer system according to an embodiment of this invention.

FIG. 1 is a block diagram showing a configuration of a computer system according to an embodiment of the invention. The computer system shown in FIG. 1 comprises computers 1A, 1B, 1C, 2A, 2B and a management computer 4, all of which are interconnected by a network 3.

Figure 11:
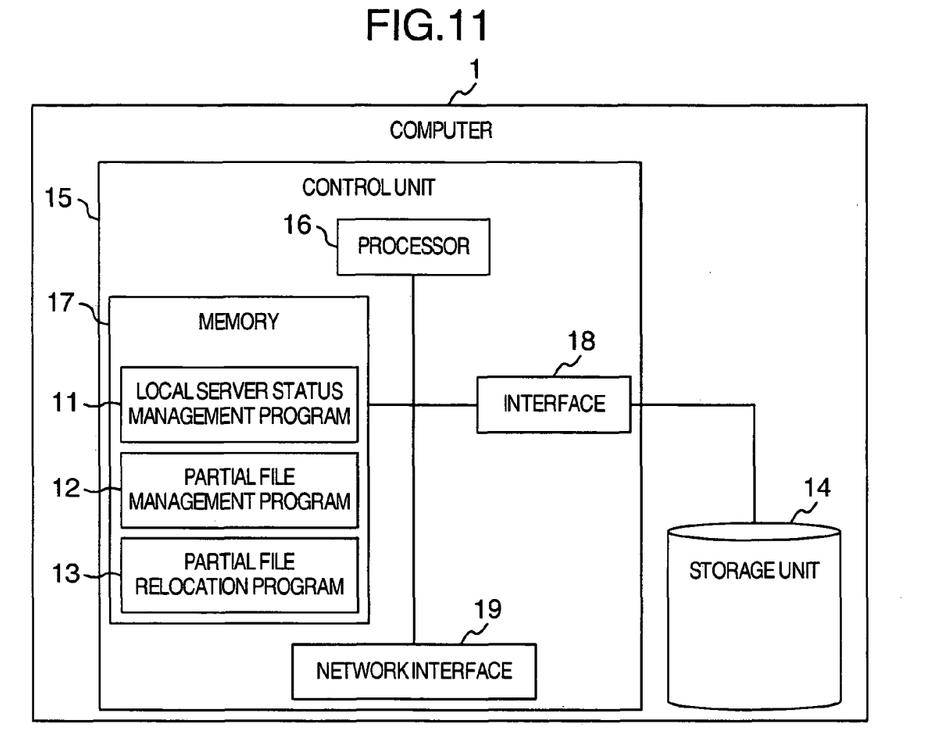
FIG. 11 is a diagram showing an example of a configuration of a computer.

FIG. 11 is a diagram showing an example of a configuration of the computer 1. The computer 1 comprises a storage unit 14 such as a hard disk or a disk array for storing data such as files and partial files and a control unit 15. The control unit 15 includes a processor 16, a memory 17, an interface 18 and a network interface 19. The processor 16 executes a program such as an operating system for managing the partial files and the files stored in the storage unit 14. These programs are stored in the memory 17, and installed in the computer 1 through a portable storage medium such as a floppy disk (registered trade name) or a network.

The storage unit 14 may be either integrated with the control unit 15 in the same housing or built in another housing. The control unit 15 and the storage unit 14 are connected to each other through the interface 18 such as SCSI or fiber channel. The control unit 15 and the storage unit 14, if accommodated in different casings, may be connected to each other by a storage area network constructed of fiber channels or the like. When the control unit 15 and the storage unit 14 are accommodated in different housings, the storage unit 14 may further have a control unit for controlling the storage unit 14 in its entirety.

The memory 17 has stored therein a server status management program 11, a partial file management program 12 and a partial file relocation program 13.

The server status management program 11 is executed in the case where the information such as the performance, security level, reliability level, utility rate or load for the computer 1 (hereinafter referred to as "the server information") is managed by the control unit 15. In the case where the server information is changed, the control unit 15 executes the program 11 and notifies the contents of change to the management computer 4 through the network 3. According to this embodiment, the control unit 15 notifies the management computer 4 of only the change of the server information not frequently updated (such as the performance, security level, reliability level and utility rate).

The control unit 15 transmits the server information of the computer 1 itself to the computer 2 based on the result of execution of the partial file management program 12.

The partial file management program 12 is executed in the case where the partial files stored in the storage unit 14 of the computer 1 are managed by the control unit 15. This program is executed also in the case where the partial files are written, read or transmitted to the requester computer 2 by the control unit 15 in response to a request from the computer 2.

The partial file relocation program 13 is executed in the case where the control unit 15 determines the destination of a partial file or controls the transfer of the partial file to other computers 1 in compliance with an instruction of the computer 2 to move the partial file. The program 13 is executed also in the case where the control unit 15 that has received a request of the control unit 15 of another computer 1 to receive a partial file receives the requested partial file and stores it in the storage unit 14.

The management computer 4 has a similar configuration to the computer 1 and includes a processor, a memory, an input/output unit and a storage unit. The memory has stored therein a distributed file information management table 43, a server information management table 44, a distributed file management program 41 and a server information management program 42.

Figure 2:
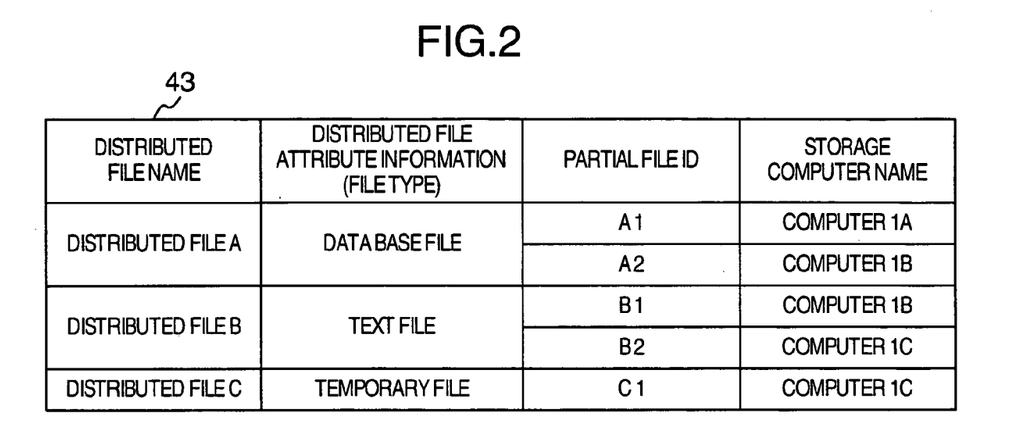
FIG. 2 is a diagram showing an example of a distributed file information management table.

The distributed file management program 41 is executed in the case where the position of each partial file making up the file managed distributively (hereinafter referred to as "the distributed file") is managed by the management computer 4. Based on the notification for creating a distributed file from the computer 2, the management computer 4 determines an ID (hereinafter referred to as "the partial file ID") unique to each partial file making up the notified distributed file, and manages the distributed file name, the partial file ID and the name of the computer storing each partial file as related to each other. A distributed file information management table 43 is used for this management. The contents of this table 43 will be described later.

The program 41 is executed also in the case where the partial file IDs and a list of the partial file positions are transmitted to the computer 2 in response to an inquiry from the computer 2 about the IDs and positions of the partial files making up the distributed file.

Figure 3:
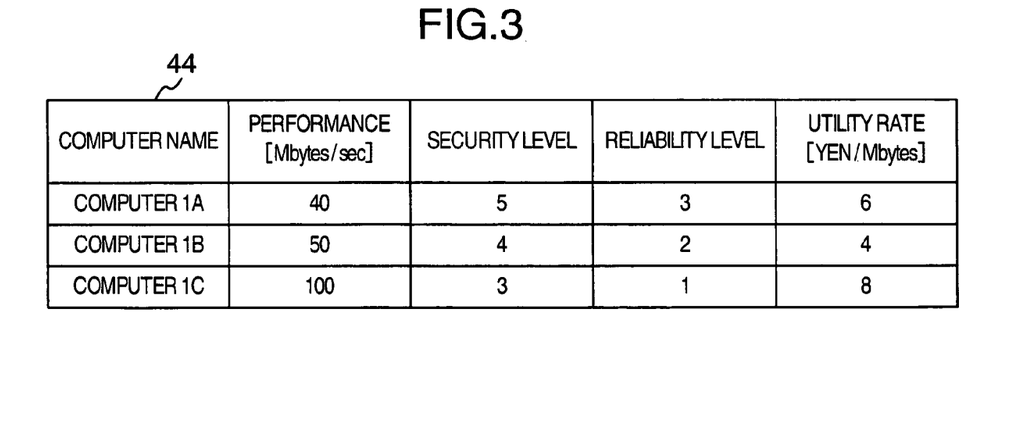
FIG. 3 is a diagram showing an example of a server information management table.

The server information management program 42 is executed in the case where the management computer 4 manages the server information transmitted from the control unit 15 of each computer 1. A server information management table 44 is used for management of the server information. The contents of this table 44 will be described later. The program 42 is executed also in the case where the management computer 4 searches the server information management table 44 for the computer 1 complying with the allocation rules contained in the inquiry from the computer 2 in response to the same inquiry and returns the result to the computer 2.

The computer 1 may have a distributed file management program 41 and thus can double as the management computer 4.

The computer 2 has a similar configuration to the computer 1, and comprises a processor, a memory, an input/output unit and a storage unit. The computer 2 receives a user instruction through the input/output unit. The computer 1 or the management computer 4 may have an input/output unit for receiving the user instruction and thus may double as the computer 2. The memory has stored therein allocation rules 23, a distributed file operating program 22 and a partial file allocation evaluation program 21.

The distributed file operating program 22 is executed in the case where a distributed file is divided into partial files, a destination computer 1 is confirmed and a partial file creation request is transmitted to each computer 1 in response to a distributed file creation request from the user.

The partial file allocation evaluation program 21 is executed in the case where an inquiry is made to the management computer 4 by the computer 2 about the presence or absence of the computer 1 complying with the allocation rules based on the items including the performance, security level, reliability level, utility rate and load information set in the computer 2 when the computer 2 confirms the computer 1 making up the destination of the partial files. In the case where the number of the computers 1 complying with the allocation rules obtained as the result of the inquiry is less than the number of partial files to be arranged, on the other hand, the computer 2 removes the items lowest in priority from the allocation rules by executing the program 21 and makes an inquiry to the management computer 4 again about the presence or absence of the computer 1 complying with the allocation-rules without the particular items lowest in priority.

The computer 2 also checks the server information received from the computers 1 to see whether the computers 1 comply with the allocation rules stipulated in advance. In the case where the check shows that any of the computers 1 fails to comply with the allocation rules, the computer 2 determines the computer 1 making up the destination of the partial files stored in the computer 1 failing to comply with the allocation rules.

Specifically, the computer 2 makes an inquiry to the management computer 4 about the presence or absence of the computer 1 complying with the allocation rule. In response to the request from the computer 2, the management computer 4 searches for the computer 1 complying with the request and transmits the result to the computer 2. The computer 2 determines computer 1 making up a destination among the computers 1 satisfying the rule which have been received as the result from the computer 4 by excluding those computers 1 in which partial files have already been allocated.

FIG. 1 illustrates the status after the creation of distributed files A, B, C. The partial file A1 (141) of the distributed file A is stored in the storage unit 14 of the computer 1A, the partial file A2 (51) of the distributed file A and the partial file B1 (52) of the distributed file B are stored in the storage unit 14 of the computer 1B, and the partial file B2 (61) of the distributed file B and the partial file C1 (62) of the distributed file C are stored in the storage unit 14 of the computer 1C.

FIG. 2 illustrates an example of a distributed file information management table 43 held by the management computer 4 in the state shown in FIG. 1. The management computer 4 manages, using the table 43, the correspondence between the unique partial file ID attached to each partial file of each distributed file and the position where the partial file is stored. In the case where each distribution file has attribute information, the particular attribute information is managed as an item corresponding to each partial file. In FIG. 2, the type of the distributed file is managed as an example of the attribute information of the distributed file. The other attribute information of the distributed file are considered to include the file owner, the file creation time and the file update time. These information are transmitted to the management computer 4 by each computer 2 upon receipt of a distributed file creation request from the user.

FIG. 3 shows an example of the server information management table 44 managed by the management computer 4. According to this embodiment, each computer 1 manages the server information including the data transfer rate (M bytes/s) of the storage unit 14 in terms of performance, the level of the user, etc. set by the manager of each computer 1 in terms of security level, the level set by the manager of each computer 1 in terms of reliability level, the charge (yen/M bytes) corresponding to the consumed capacity of the storage unit 14 of each computer 1 in terms of utility rate and the occupancy rate (%) of the storage area of the storage unit 14 of each computer 1 in terms of load information. Only the information on performance, security level, reliability level and utility rate of which the value is rarely updated are assumed to be transmitted from each computer 1 to the management computer 4. This is in order to suppress the communication traffic between the management computer 4 and each computer 1. As shown in FIG. 3, therefore, the management computer 4 manages only the information from each computer 1 by means of the server information management table 44.

The server information may be registered in the management computer 4 in such a manner that the server information is either transmitted automatically to the management computer 4 from each computer 1 connected through the network 3 or set manually by the user or the manager at the time of initial setting of the distributed file system. Each time of a change which the server information may undergo, on the other hand, the information is transferred from the computer 1 to the management computer 4 or manually registered by the user, etc.

Figure 4:
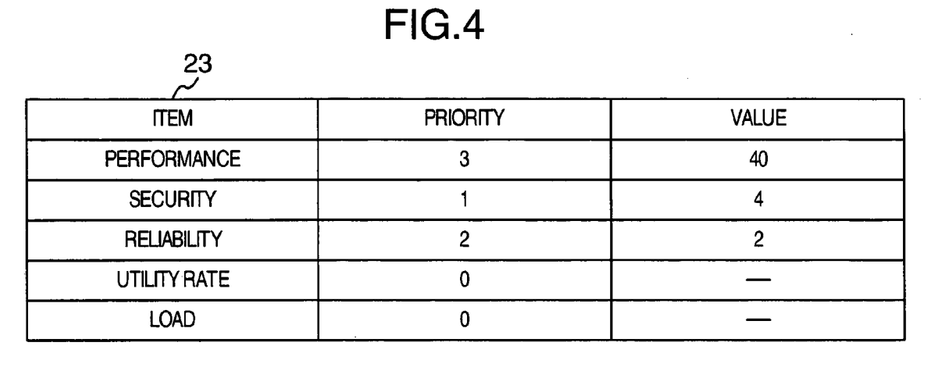
FIG. 4 is a diagram showing an example of allocation rules and priority setting information.

FIG. 4 shows an example of an allocation rule table 23 defined in advance in the computer 2A. In FIG. 4, performance, security, reliability, utility rate and load are employed as items of the allocation rules. Nevertheless, other combinations of the items may be used with equal effect.

In the allocation rule table 23, the priority is set for each item. In the case where the computers 1 complying with the allocation rules are not sufficient in number, the computer 2 removes the items from the allocation rule table 23 in accordance with the priority set for each item and thus relaxes the conditions for the allocation rules. As a result, the partial files can be distributed under the second-best allocation rules.

In FIG. 4, performance is set as an item of 3 in priority, so that the partial files are arranged for the computer 1 with the performance value of not less than 40 (M bytes/s). On the other hand, security is set as an item of 1 in priority, so that the partial files are arranged in the computer 1 having a security level of not less than 4. Similarly, reliability is set as an item of 2 priority, so that the partial files are arranged in the computer 1 having a reliability level of not less than 2. Further, utility rate and load are set as 0 in priority, thereby indicating that these are not applicable as items under the allocation rules. The description that follows assumes that the priority of 1 is higher in priority than the priority of 3.

This embodiment deals with a case in which a single combination of items is set for the allocation rules. As other embodiments, however, the invention is applicable to a case in which the user determines the order of priority of items at the time of arranging each distributed file, thereby using allocation rules configured of items desired by the user at the time of arranging each distributed file.

In this case, the computer 2 displays the items of the allocation rules on the input/output unit at the time of creating a distributed file, and causes the user to input the order of priority of the items. In the process, the user sets a high priority for the desired items. Conversely, the user can eliminate a given item from the allocation rules by inputting the priority of 0 for the particular item. Further, the user may add a new item.

Figure 10:
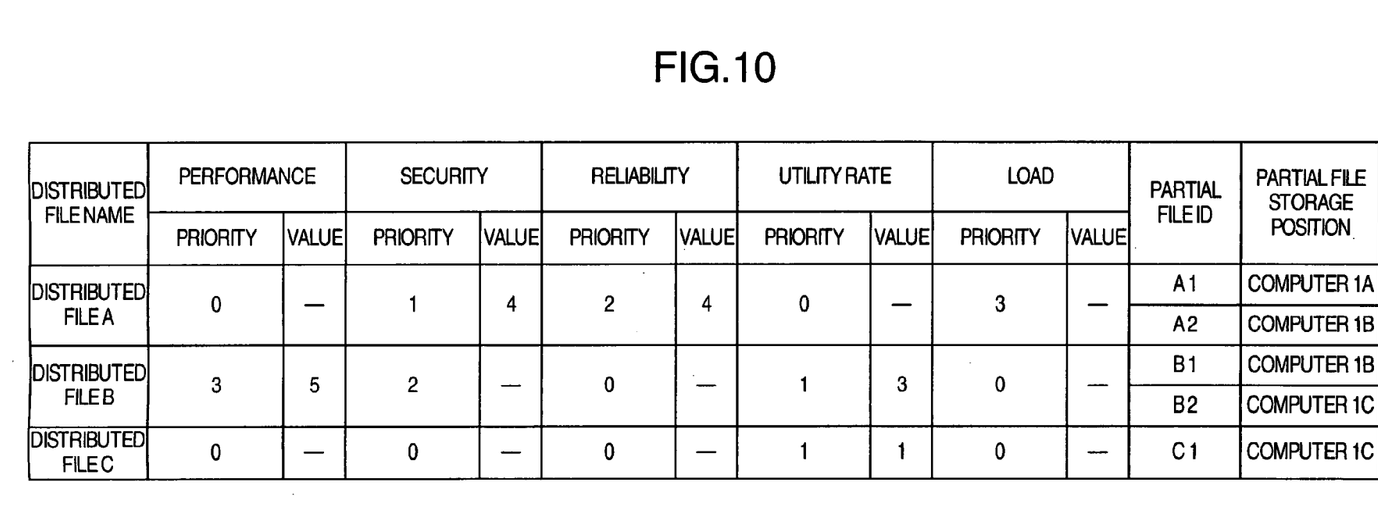
FIG. 10 is a diagram showing an example of a distributed file information management table.

The items and the priority set in this way are recorded by the computer 2 in a memory as an allocation rule table 23 for the distributed files. At the same time, the information on the set allocation rules is transmitted to the management computer 4. The management computer 4 expands the distributed file information management table 43 of FIG. 2 in the manner shown in FIG. 10, and manages the allocation rules for each distributed file as attribute information of the distributed file.

Figure 9:
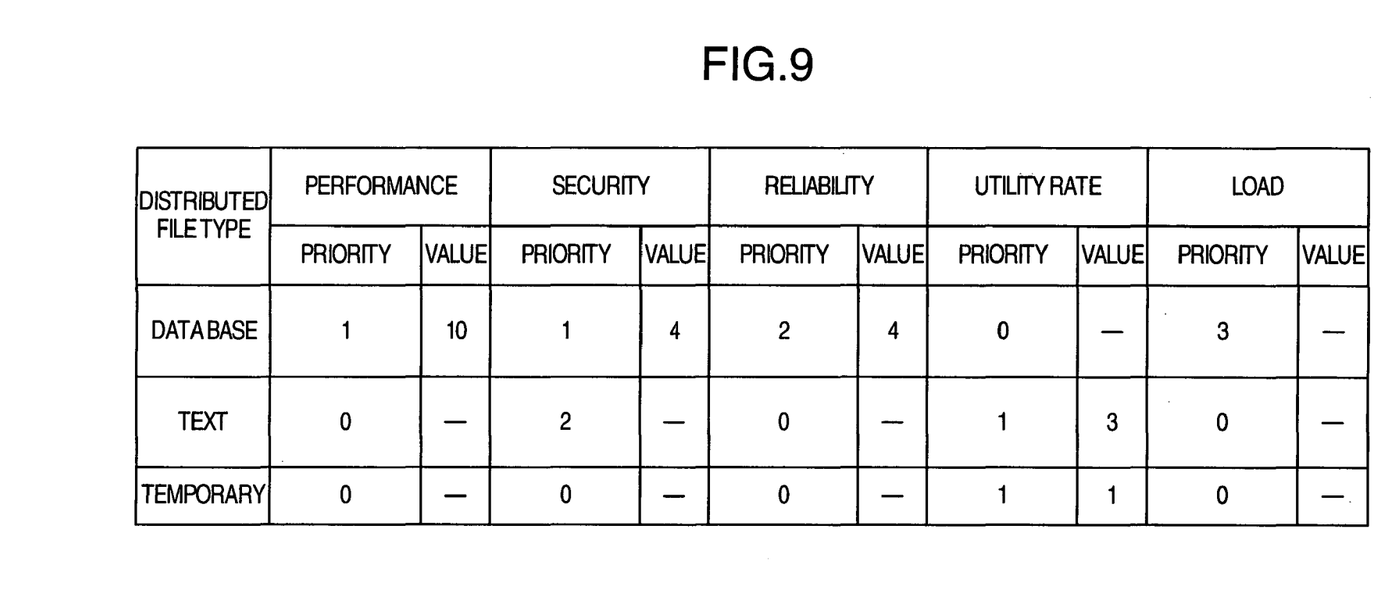
FIG. 9 shows an example of a correspondence table showing the applicable rules for different types of distributed files.

According to this embodiment, the same allocation rules are used for all types of distributed files. In other embodiments, however, different applicable rules may be selected and the priority thereof set automatically for different types of distributed files. In such a case, the computer 2, as shown in FIG. 9, holds different allocation rule tables 23 shown in FIG. 4 for different file types. At the request of the user to a create distributed file, the computer 2 automatically selects applicable allocation rules from the allocation rule table of FIG. 9 in accordance with the file type required, and sets the priority, if necessary.

The information on the allocation rules for each file type set in the computer 2 may be either manually input by the user of the computer 1 or automatically transferred from the management computer 4 when the computer 2 is newly connected to the network 3. Further, the information on the newly added items for the allocation rules are transferred to each computer 1 and the management computer 4, which start to collect or otherwise handle the server information corresponding to the added items of the allocation rules.

Next, an explanation will be given about the processing steps followed in the case where the user requests the computer 2A to create the distributed file A whereby the partial file A1 (141) and the partial file A2 (51) are created in the computer system shown in FIG. 1.

Upon receipt of a request from the user to create the distributed file A through the input/output unit, the computer 2A regards the file designated by the user as the distributed file A, and by dividing the distributed file A into predetermined sizes, creates partial files (two partial files A1 (141) and A2 (51) in this case). After that, the computer 2A notifies the management computer 4 of the number (two in the case under consideration) of partial files to be created.

The management computer 4 creates as many unique partial file IDs as the partial files notified from the computer 2A in the computer system managed thereby, and notifies the computer 2A of the partial file IDs thus created. The computer 2A that has received the partial file IDs from the management computer 4 assigns the received partial file IDs to each partial file. Further, the computer 2A determines the computers 1 in which the partial files are to be arranged. The steps of this determining process will be explained below.

Figure 5:
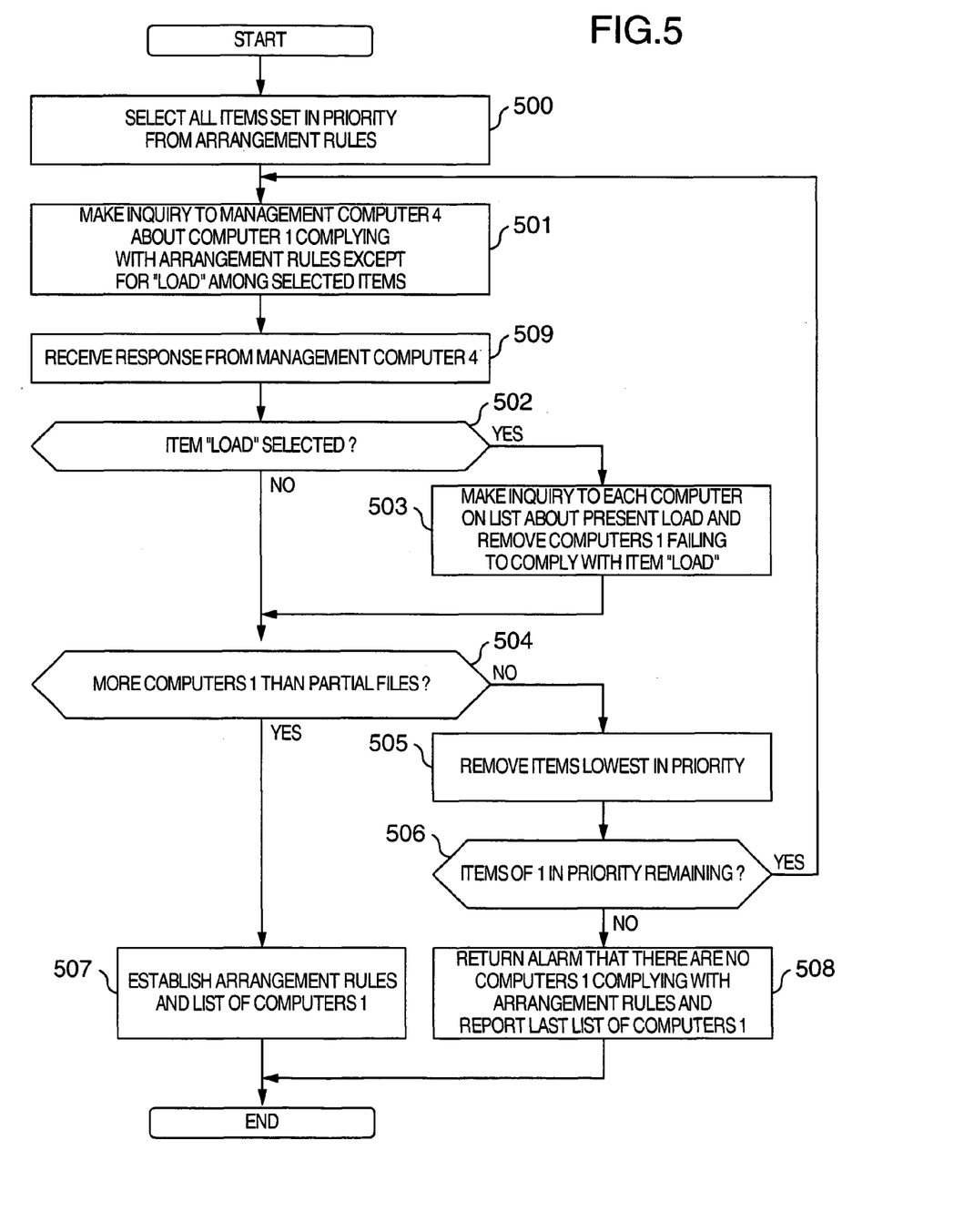
FIG. 5 is a flowchart showing an example of the processing operation for selecting a destination computer for partial files.

FIG. 5 is a flowchart showing the steps followed by the computer 2A to establish a list of the computers 1 in which the partial files are to be arranged.

First, the computer 2A selects all the items set to the priority of 1 or higher, from the items of the allocation rule table 23 held therein. In the case where a specific allocation rule table 23 is predetermined for each file, the computer 2 selects the particular specific allocation rule table 23 before selecting items (step 500). After that, the computer 2A transmits to the management computer 4 a command to make an inquiry about the computers 1 complying with the allocation rules defined by the selected items (step 501). The information on the items not registered in the management computer 4, however, is not taken into consideration in the response from the management computer 4.

The computer 2A that has received the response to the inquiry command (step 509) determines whether "load" has been selected as an item of the allocation rules. This is by reason of the fact that according to this embodiment, the "load" information is not managed by the management computer 4, and therefore, it is necessary to determine again whether the conditions for "load" are met or not by a list of the computers 1 transmitted from the management computer 4. Apart from "load" taken as an example of an item in this embodiment, items not managed by the management computer may be an item other than "load". In the presence of such an item, the computer 2 executes a similar process to the one described herein for the particular item (step 502).

In the case where "load" is selected as an item, the computer 2A issues a command to make inquiry about the current "load" information to all the computers 1 included in the list of the computers 1 obtained in step 501. Based on the response to the command, the computer 2A removes from the list the computers 1 failing to meet the conditions set for the item "load" of the allocation rules (step 503).

Next, the computer 2A determines whether the computers 1 not smaller in number than the created partial files (2 in our case) are included in the list of the computers 1 corrected in step 503 (step 504). In the case where the computers 1 not less than the partial files are contained in the list, however, the computer 2 determines applicable allocation rules and the list of the computers 1 (step 507).

In the case where the number of computers 1 included in the list of the computers 1 is not more than the number of the partial files in step 504, the computer 2A removes those items selected in step 501 for the allocation rules which are lowest in priority (step 505). Then, the computer 2A determines whether the items highest in priority, i.e. the items of 1 in priority remain or not in the allocation rule table 23 (step 506). In the case where no item of 1 in priority remains (all the items have been removed), the computer 2A displays an alarm to the user while at the same time displaying the immediately preceding list (the list of the computers 1 from which the items of 1 in priority are not yet removed) (step 508). In the case where the items of 1 in priority remain in the allocation rule table 23 in step 506, the computer 2A repeats the process of step 501 and subsequent steps, and thus establishes a list of the computers 1 complying with the allocation rules made up of the remaining items.

After that, the computer 2A selects as many computers 1 as the partial files at random from the established list of the computers 1. Then, the computer 2A instructs each of the computers 1 thus selected (the computers 1A and 1B in the case under consideration) to create the partial files A1 and A2, respectively. This instruction contains the data on the partial files and the partial file IDs. Further, the computer 2A notifies the management computer 4 of the information on the distributed file created, i.e. the distributed file name, the partial file IDs and the places where the partial files are arranged (information specifying the computer 1).

As described above, the computer 2A issues an alarm to the user to the effect that the computers 1 complying with the allocation rules are not sufficient in number, based on the process of step 508 shown in FIG. 5. At the same time, in the case where at least one computer 1 is included in the created list of computers 1, the computer 2A may cause the user to determine whether all or a plurality of the partial files are arranged in the same computer 1. In the case where the user determines that all or a plurality of the partial files may be so arranged, the computer 2 arranges a plurality of the partial files in the same computer 1.

In the case where the list of the computers 1 complying with the allocation rules, except for the items low in priority, cannot be obtained based on the process of step 508 shown in FIG. 5, the computer 2A may issue an alarm by displaying the removed items to the user through the input/output unit.

Next, the steps of operation of the computers 1 that have received the instruction to create the partial files will be explained.

All the computers 1 (the computers 1A and 1B in the case under consideration) instructed to create a partial file create the partial files in the internal storage unit 14 of the corresponding computer 1, respectively, based on the data transferred thereto together with the instruction. Also, the computers 1 create a table of correspondence between the partial file IDs received from the computer 2A and the storage positions of the partial files in the storage unit 14.

The management computer 4 that has received the inquiry command from the computer 2A in step 501 shown in FIG. 5 operates in the manner described below. Specifically, based on the items of the allocation rules transmitted from the computer 2A (FIG. 4), the management computer 4 extracts the computers 1 (the computers 1A and 1B in the case under consideration) complying with the allocation rules of FIG. 4 from the server information management table 44 shown in FIG. 3. The information on the computers 1 thus extracted is transmitted to the computer 2A as a list of the computers 1 complying with the allocation rules.

Figure 6:
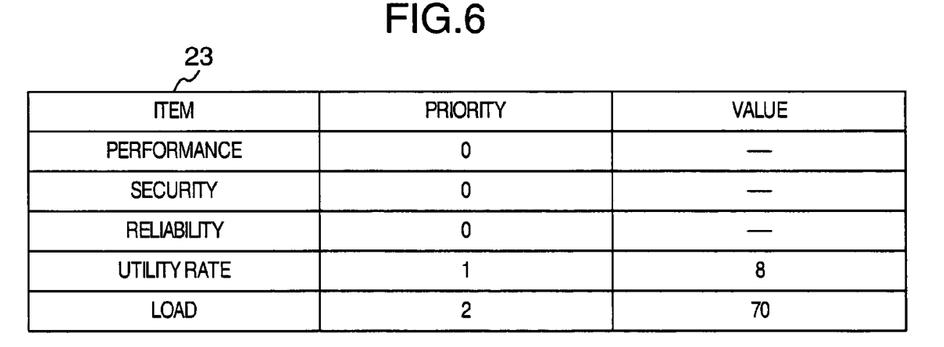
FIG. 6 shows an example of the allocation rules and the priority setting information.

Next, an explanation will be given about the process of steps executed in the case where the user issues a request to the computer 2B to access the distributed file B and the process of the operation performed in the case where the partial files are moved (relocated) with this access request as a motive. Other motives for movement (relocation) of the partial files may include the receipt by the computer 2 of a request to rewrite the contents of the partial files, a predetermined period, or a time point designated by the user. Also, this embodiment assumes that the items of the allocation rules and the priority thereof are set in the computer 2B as shown in FIG. 6.

First, assume that a request to access the distributed file B is given to the computer 2B from the user through the input/output unit. The computer 2B transmits to the management computer 4 a command making inquiry in which computer 1 each partial file making up the distributed file B is located.

The management computer 4 that has received the inquiry command accesses the distributed file information management table 43 and transmits to the computer 2B the partial file IDs of the partial files of the distributed file B and the names of the computers 1 storing the particular partial files. According to this embodiment, the management computer 4 transmits the information indicating that the partial file B1 (52) and the partial file B2 (61) are stored in the computer 1B and the computer 1C, respectively.

Figure 8:
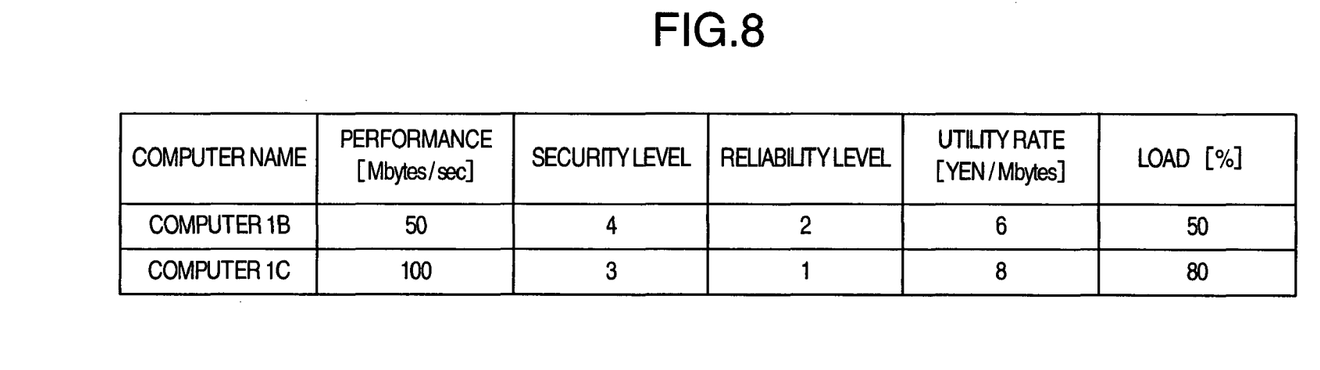
FIG. 8 shows an example of the allocation rules and the priority setting information.

The computer 2B that has received the information on the partial files of the distributed file B from the management computer 4 transmits a request to read the partial file B1 (52) to the computer 1B and a request to read the partial file B2 (61) to the computer 1C. Each computer 1 reads the corresponding partial file in response to the request from the computer 2B and transmits it to the computer 2B. In the process, each computer 1 also transmits the server information of each computer 1 to the computer 2B. In this embodiment, assume that the server information shown in FIG. 8 is transmitted to the computer 2B. In the case where the files are relocated with another event as a motive, the computer 2 may issue a command to request the server information from each computer 1 having the partial files making up the distributed file with the particular event as a motive.

The computer 2B restores the distributed file B from the partial file B1 (52) and the partial file B2 (61) thus received. Also, the computer 2B evaluates the allocation of all the partial files making up the distributed file based on the server information received from each computer 1.

The allocation of the partial files is evaluated specifically as described below. The computer 2B compares the server information transmitted from each computer 1 holding the partial files with the allocation rules registered in the computer 2B, and checks to see whether the computer 1 holding the partial files of the distributed file B complies with the allocation rules corresponding to the distributed file B. In this embodiment, the computer 2B compares the server information shown in FIG. 8 with the allocation rules shown in FIG. 6. In the case where the allocation rules are already determined for each distributed file, the computer 2B makes a comparison after determining the allocation rules corresponding to the distributed file B from the allocation rule table 23 of the computer 2B itself.

In the case where the evaluation shows the existence of the computer 1 failing to comply with the allocation rules held in the computer 2B, the computer 2B executes the process for moving the partial files. According to this embodiment, the computer 1C fails to comply with the allocation rules for the item "load", and therefore the partial B2 (61) stored in the computer 1C is moved. The process of moving a partial file will be explained below.

In moving the partial files, the computer 2B first checks the number of the computers 1 failing to comply with the allocation rules and the number of the partial files stored in the computers 1 failing to comply with the allocation rules. Normally, each computer 1 stores only one partial file, and therefore the number of the computers 1 coincides with that of the partial files. In the presence of a computer 1 storing double partial files of a single distributed file, however, the number of the partial files contained in the computers 1 is greater than the number of the computers 1 failing to comply with the allocation rules. The partial files thus checked make up an object of movement.

After that, the computer 2B acquires a list of the computers 1 complying with the allocation rules as candidates for the destination computer 1 from the management computer 4. The computer 2B determines a destination computer 1 from the list of the computers 1, and instructs the computer 1 having the partial file making up the object of movement to move the data to the destination computer 1.

Figure 7:
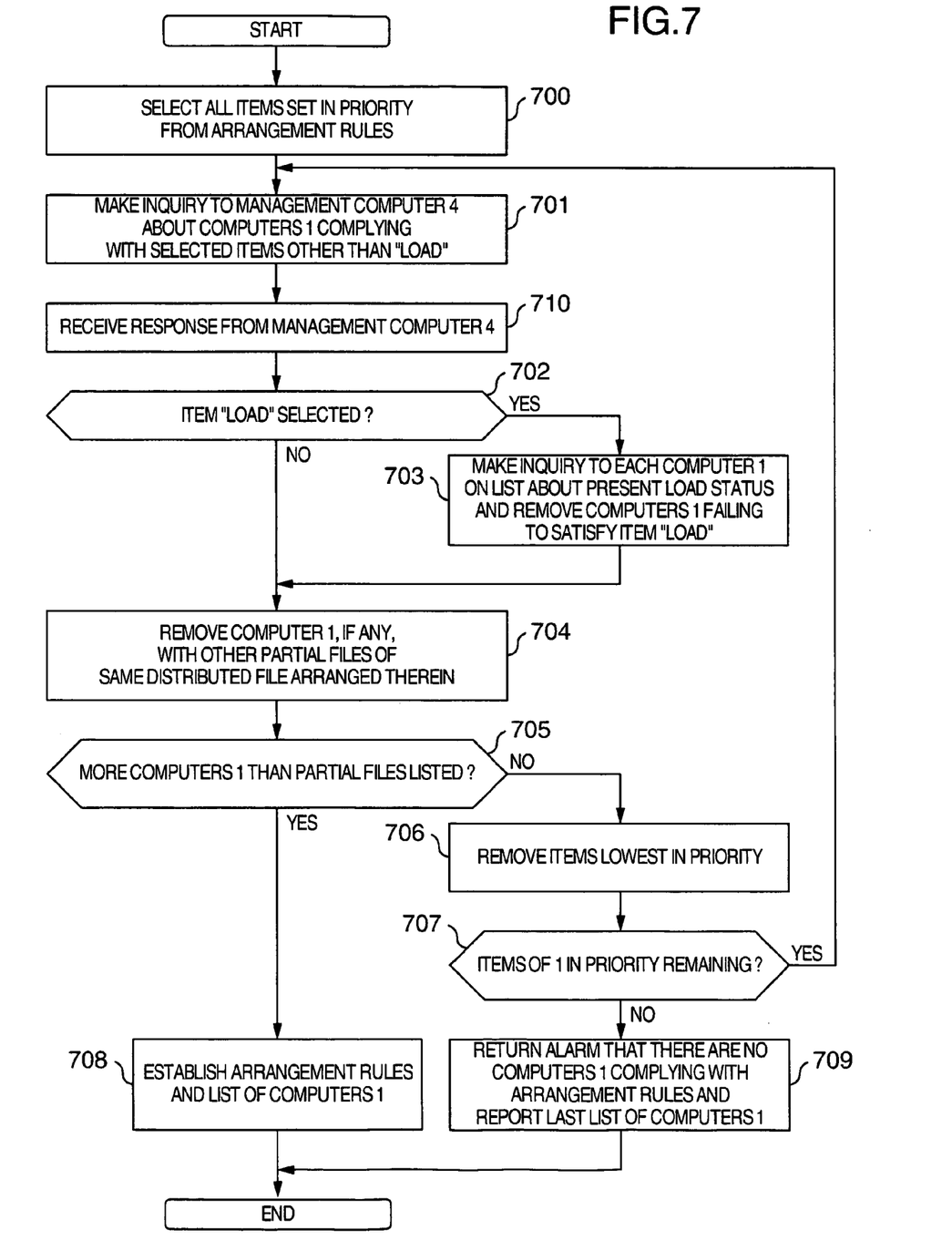
FIG. 7 is a flowchart showing an example of the processing operation for selecting a destination computer of partial files.

FIG. 7 is a flowchart showing the steps of establishing the list of the computers 1 constituting candidate destinations.

First, the computer 2B selects all the items with the priority thereof set to 1 or higher, from the allocation rule table 23 (step 700). After that, the computer 2B issues to the management computer 4 a command making an inquiry about the presence or absence of the computers 1 complying with the allocation rules configured of the selected items (step 701).

The management computer 4 that has received the command searches the server information management table 44 for the computers 1 complying with the allocation rules made up of the received items, and transmits the list of the computers thus obtained to the computer 2B. In this embodiment, the management computer 4 selects the computer 1A as a computer 1 complying with the allocation rules of FIG. 6 and notifies the computer 2B (step 710).

The computer 2B that has received the list of the computers 1 complying with the allocation rules determines whether "load" has been selected as an item of the allocation rules held in the computer 2B (step 702). In the case where the item "load" is selected, the computer 2B issues the command making inquiry about the current "load" information to all the computers 1 included in the received list of the computers 1. Upon receipt of the responses from all the computers 1 to which the command is sent, the computer 2B removes, based on the responses, the computers 1 failing to meet the conditions of the item "load" from the list of the computers 1 acquired (step 703).

Next, the computer 2B determines whether the list includes the computers 1 holding other partial files than those to be moved, which are included in the distributed file (the distributed file B in the case under consideration) holding the partial files to be moved. Specifically, the names of the computers 1 storing the other partial files received from the management computer 4 at the time of accessing a distributed file are compared one by one with the names of the computers 1 included in the list. In the case where the computers 1 holding such other files are included in the list, the computer 2B removes the particular computers 1 from the list (step 704).

Next, the computer 2B determines whether the list of the computers 1 obtained in or before step 704 contains the computers 1 greater in number than the partial files to be moved (step 705). In the case where the computers 1 greater in number than the partial files is contained in the list, the computer 2B establishes the applicable allocation rules and the list of the computers 1 (step 708). In this embodiment, the conditions of steps 702 to 705 are confirmed for the computer 1A notified by the management computer 4, and the computer 1A is finally determined as a list of the destination computer 1.

In the case where the computers 1 more than the partial files to be moved are not contained in the list of the computers 1, on the other hand, the computer 2B removes the items lowest in priority from the allocation rule table 23 (step 706). After that, the computer 2B determines whether items of 1 in priority remain in the allocation rule table 23 as the result of removal (step 707). In the case where no item of 1 in priority remains (all the items are removed), the computer 2B alarms the user, and determines the finally obtained list of the computers 1 (i.e. the list of the computers 1 before the last removal of the items of 1 in priority order) as a list of the destination computers 1 (step 709).

In the case where the items of 1 in priority remain in the allocation rule table 23 in step 707, on the other hand, the computer 2B returns to the process of step 701, issues a command to the management computer 4 to make an inquiry about the computers 1 complying with the allocation rules configured of the remaining items, and subsequently establishes a list of the desired computers 1 by executing similar steps.

After that, the computer 2B selects at random as many destination computers 1 as the partial files to be moved, from the established list of the destination computers 1. The computer 2B then transmits the partial file IDs of the partial files to be moved the information on the prospective destination computers 1, to the computers 1 which are determined not to comply with the allocation rules.

The computer 1 that has received from the computer 2B the partial file IDs of the partial files to be moved and the information on the prospective destination computers 1 specifies the storage position of the partial files using the partial file IDs received, and transmits the designated partial files to the designated computers 1.

According to this embodiment, the computer 2B selects the computer 1A as a destination computer 1, and transmits the partial file ID of the partial file B2 (61) and the information indicating the computer 1A to the computer 1C. The computer 1C, upon receipt of the designation, transfers the partial file B2 (61) to the computer 1A in accordance with the designation of the computer 2B.

Assume that the list of the prospective destination computers 1 which satisfy the rule contains more computers 1 in number than the number of the partial files to be moved. Then, the computer 2B may assign a plurality of the computers as candidates of destination computers for one partial file. In this case, a plurality of partial files are distributed so that they are assigned to one computer in a manner not to double the distribution. After that, the computer 2B transmits an instruction to the computers 1 storing the partial files to move the partial files, while at the same time transmitting the information designating a plurality of the computers 1 as candidate destinations. The computer 1 that has received the information on a plurality of the prospective destination computers 1 freely selects a destination computer 1 using the received information on a plurality of the computers 1 and transfers the partial files.

Also, this embodiment can be so configured that the computer 1 having the partial files to be moved can hold the execution of the move instruction from the computer 2 until predetermined conditions are met. Further, the computer 1 holding the movement of the partial files, upon receipt of repeated instructions to move the partial files held therein, selects, as destination computers 1, those computers 1 designated as a destination by all the move instructions.

The computer 2B, based on the process of step 709 in FIG. 7, may display on the input/output unit an alarm to the user to the effect that the partial files are arranged in the computers 1 failing to comply with the allocation rules and the destination computers 1 complying with the allocation rules cannot be found. Also, in the case where the list of the prospective destination computers 1 contains the computers 1 smaller in number than the partial files, the computer 2B may display on the input/output unit an alarm to the user to the effect that the partial files are arranged in the computers 1 failing to comply with the allocation rules and the number of the destination computers 1 complying with the allocation rules is insufficient.

Further, the computer 2B may cause the user to determine whether a part or all of the partial files failing to comply with the allocation rules may be moved to the same computer 1. In the case where the users permits the double assignment of partial files, the computer 2B extracts the computers 1 at random from the list of the destination computers 1 and instructs a plurality of the computers 1 having the partial files to be moved, to move the partial files to the extracted computers 1.

As described above, the computers 1 may hold the execution of the process of moving the partial files for a predetermined length of time or until a predetermined number of move instructions are received from the computer 2B. As a result, in the case where a plurality of computers 2 access the same partial file during a short length of time, the phenomenon is avoided in which the partial files are moved each time they are accessed, due to the difference of the allocation rules from one computer 2 to another, thereby making it possible to reduce the load otherwise imposed on the computer system by the frequent movement of the partial files.

The computers 1 holding the process of moving the partial files executes the moving process in the pattern described below.

First, in the case where only one process of moving the partial files is held and only one destination computer 1 is designated as an object of movement, then the computers 1 holding the move process transfer the partial files to the computers 1 designated as a destination.

In the case where only one move process is held but a plurality of the destination computers 1 are designated as an object of movement, on the other hand, the computer 1 holding the move process selects a computer 1 at random from a plurality of designated computers 1 and transfers the partial file to the selected computer 1.

In the case where a plurality of move processes are held and one or a plurality of destination computers 1 are designated for each of the move processes, then the computers 1 holding the move process transfer the partial files to a common computer 1 among the destination computers 1 designated for each process held. In the absence of a common computer 1, the computers 1 holding the move process do not execute the move process.

After being notified from the destination computer 1 that the movement of the partial files is complete, the computer 2B notifies the management computer 4 of the partial file ID and the information (network address, etc.) on the destination computer 1 to which the partial files are moved.

According to this embodiment, the computer 2B notifies the management computer 4 of the partial file ID of the partial file B2 (61) and the information on the destination computer 1A to which the partial file is moved.

The partial files may be transferred by other than the method according to the aforementioned embodiments.

Specifically, in the case where a plurality of computers 1 making up destinations for movement are designated, the computer 1 for executing the move process may transfer the partial files to all the destination computers 1. In this case, the partial files stored in the storage unit of the computer 1 executing the move process are deleted.

Without transferring the partial files to all the destination computers 1, on the other hand, the computer 1 executing the move process may select a plurality of computers 1 from a plurality of candidate destination computers 1 and transfer the partial files to the selected computers 1.

Further, assume that a plurality of move processes are held each designating one or a plurality of destination computers 1 and that no common computer 1 is available. The computer 1 holding the move process transfers the partial files to all (or a part of) the computers 1 designated as a destination for each move process.

According to this method, the computer 1 executing the move process is required to notify the management computer 4 that the same partial file has been transferred to a plurality of the computers 1.

Figure 12:
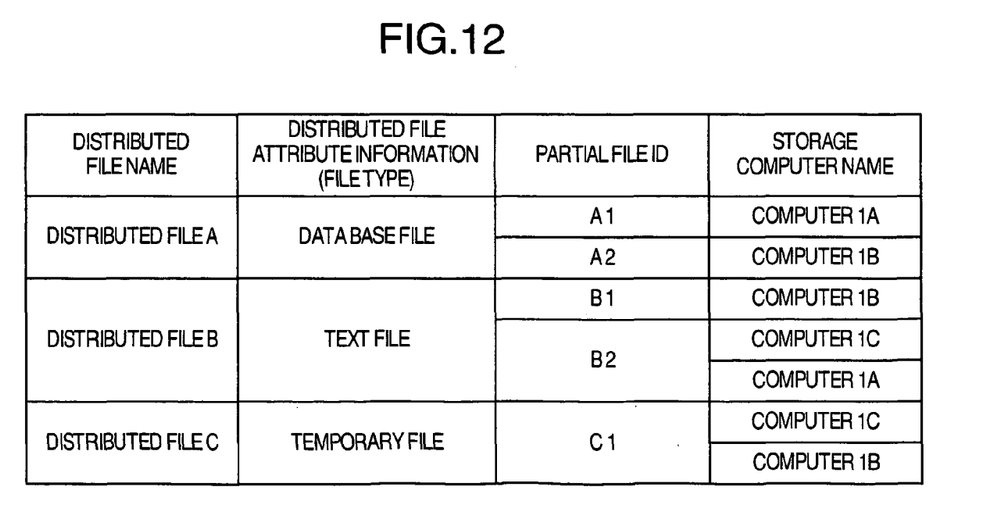
FIG. 12 is a diagram showing an example of a partial file information management table.

FIG. 12 is a diagram showing an example of he distributed file information management table 43 held in the management computer 4 according to this method. In FIG. 12, unlike in the distributed file information management table 43 explained with reference to FIG. 2, a plurality of entries are prepared to be registered as information on the computers 1 where the partial files are held.

Also, according to this method, the advisability of arranging a partial file in a plurality of computers 1 (hereinafter referred to as "copying a partial file") may be determined in the manner described below.

Figure 13:
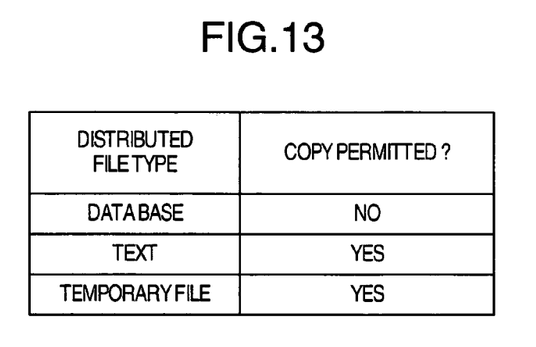
FIG. 13 is a diagram showing an example of the file attribute information of the partial file information management table.

In a first case, the advisability is designated by the user. In this case, the entries shown in FIG. 13 are set as attribute information of the files in the distributed file information management table 43. At the time of creating a distributed file, the user sets the values of the entries indicated in FIG. 13 through the computer 2 thereby to determine the advisability of copying the partial file of a given distributed file. The computer 1 copies the partial file by referring to the information thus set.

Figure 14:
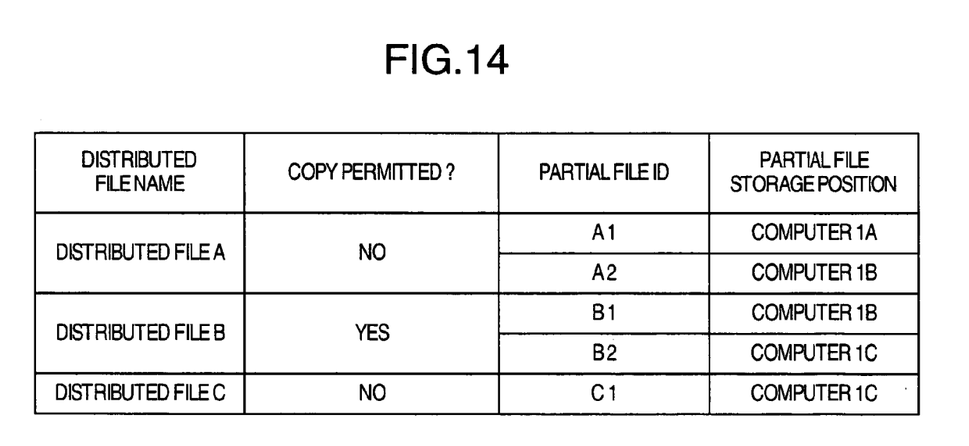
FIG. 14 is a diagram showing an example of a table for registering the information as to the advisability of copying the partial files.

In another case, advisability permission and no permission of copying a partial file is determined according to the file type, and at the time of relocation of a distributed file, the computer 1 transferring the partial file automatically copies the partial file based on the particular information regarding the advisability of copying. In this case, the management computer 4 or the computer 1 holds the table as shown in FIG. 14 in advance.

Based on the information thus set, the computer 1 copies the partial file. In the case where the set information is available only in the management computer 4, the computer 1 executing the move process makes inquiry to the management computer 4 about the advisability of copying the partial file, and copies the partial file in accordance with the response to the inquiry.

Further, according to this method, a plurality of computers 1 come to have the same partial file. The computer 2 accessing a distributed file, therefore, is required to determine which computer 1 is to be accessed for the partial file. Some examples of the method for this determination are described below.

A first example is for the management computer 4 to determine the computer 1 to be accessed. In this case, upon receipt of an inquiry from the computer 2 about the location of the partial file, the management computer 4 selects one computer 1 at random from a plurality of locations registered in the partial file information management table 43 and notifies the particular information to the computer 2.

In a second example, the computer 2 accessing a distributed file determines the computer 1 to be accessed. The management computer 4 that has received an inquiry about the location of the partial files notifies all the computers 2 of the information on a plurality of computers 1 storing the same partial file. The computers 2 that have received the information on a plurality of computers 1 selects an arbitrary one of the plurality of the computers 1, and issues a partial file transmission request. The computer 1 may be selected by the computer 2 according to any of the methods described below.

In one method, the computer 2 issues a partial file transmission request to all the computers 1 included in the information received from the management computer 4, and employs the first-arriving response. In this case, the computer 2 transmits a partial file transmission suspension instruction to the other computers 1.

A second method is such that the computer 2 acquires the partial files at the same time from all the computers 1 included in the information received from the management computer 4. Specifically, the computer 2 issues an acquisition request to each computer 1 by designating the offset of each partial file (namely, a request in the wording "Transmit X bytes from the first Xth byte of the partial file" is issued separately to each computer 1).

This method makes it possible to relocate the partial files among the computers in the computer system with higher versatility.

According to the embodiments described above, the computer system, even if a given partial file has no information on the other partial files, can arrange the partial files without any double assignment simply by acquiring the information on the computers 1 complying with the allocation rules from the management computer 4. As a result, the files can be distributed while at the same time maintaining the security of the computer system.

According to this invention, the chance of concentrating all the partial files of a distributed file on a specific server can be avoided, and at the same time, the distributed files can be arranged while maintaining the security of the computer system.

Also, a plurality of various allocation rules may be laid down, and the partial files can be arranged in versatile way accordingly.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system comprising at least one first computer, a second computer and a third computer connected to one another via a network,
wherein said third computer has information concerning said first computer, and said second computer has information as an allocation rule including a plurality of evaluation items for defining file distribution;
wherein said second computer, upon receipt of an instruction to create a distributed file, transmits said allocation rule to said third computer via the network;
wherein said third computer, upon receipt of said allocation rule, specifies said first computer complying with said allocation rule by reference to the information concerning said first computer, and transmits said information concerning said specified first computer to said second computer via the network;
wherein said second computer transmits partial files of the distributed file instructed for creation, to said first computer via the network based on the received information of said first computer;
wherein said second computer includes a plurality of allocation rules corresponding to file types, and uses the allocation rules corresponding to said file type for which a creation instruction is issued;
wherein said allocation rule which the second computer transmits to the third computer is determined in accordance with a user's instruction in creating the distributed file;
wherein priority is set for each of the evaluation items included in said allocation rule; and
wherein, based on the priority set for each of the evaluation items included in said allocation rule, the third computer selects the first computer meeting a higher priority condition by removing evaluation items with lower priority conditions.

2. A computer system connected to at least one first computer and a second computer via a network, comprising a control unit and a storage unit,
wherein said control unit has information indicative of allocation rules including a plurality of evaluation items for defining file distribution,
wherein said control unit transmits said allocation rules to said second computer via the network in response to an instruction to create distributed files,
wherein partial files of a file for which a creation instruction is given are transmitted to said second computer via the network, based on information of said first computer received from said second computer via the network;

wherein said allocation rules transmitted to said second computer are determined in accordance with a user's instruction in creating the distributed files;

wherein said allocation rules correspond to file types, and said second computer uses the allocation rules corresponding to said file type for which a creation instruction is issued;

wherein priority is set for each of the evaluation items included in said allocation rule; and wherein, based on the priority set for each of the evaluation items included in said allocation rule, the third computer selects the first computer meeting a higher priority condition by removing evaluation items with lower priority conditions.

3. A method of file distribution for a computer system including a plurality of first computers, a second computer and a third computer connected to one another via a network, said second computer having information as an allocation rule including a plurality of evaluation items for defining distribution of files, said method comprising;

transmitting said allocation rule to said third computer from said second computer via the network when said second computer is instructed to create a distributed file;

specifying a relevant one of said first computers meeting said allocation rule, through said third computer that has received said allocation rule, with reference to information concerning said first computers, and transmitting information concerning said specified first computer to said second computer via the network;

wherein said second computer transmits partial files of a file instructed for creation, to said relevant first computer via the network based on said received information concerning said first computer;

wherein said second computer includes a plurality of allocation rules corresponding to file types, and uses the allocation rules corresponding to said file type for which a creation instruction is issued; and determining said allocation rule which the second computer transmits to the third computer in accordance with a user's instruction in creating the distributed file;

wherein priority is set for each of the evaluation items included in said allocation rule; and wherein specifying said relevant one of said first computers meeting said allocation rule comprises, based on the priority set for each of the evaluation items included in said allocation rule, selecting the relevant first computer meeting a higher priority condition by removing evaluation items with lower priority conditions.

* * * * *